(12) United States Patent  
Steiner

(10) Patent No.: US 9,872,191 B2  
(45) Date of Patent: Jan. 16, 2018

(54) METHOD, SYSTEM, AND APPARATUS OF RANGE MEASUREMENT IN A WIRELESS NETWORK

(71) Applicant: INTEL IP CORPORATION, Santa Clara, CA (US)

(72) Inventor: Itai Steiner, Tel Aviv (IL)

(73) Assignee: INTEL IP CORPORATION, Santa Clara, CA (US)

(*) Notice: Subject to any disclaimer, the term of this patent is extended or adjusted under 35 U.S.C. 154(b) by 180 days.

(21) Appl. No.: 14/736,522

(22) Filed: Jun. 11, 2015

(65) Prior Publication Data

US 2016/0366606 A1    Dec. 15, 2016

(51) Int. Cl.

| H04W 24/10 | (2009.01) |
|---|---|
| H04L 5/00 | (2006.01) |
| H04W 24/02 | (2009.01) |
| H04W 84/12 | (2009.01) |

(52) U.S. Cl.  
CPC .......... *H04W 24/10* (2013.01); *H04L 5/0055* (2013.01); *H04W 24/02* (2013.01); *H04W 84/12* (2013.01)

(58) Field of Classification Search  
CPC ....... H04L 5/0055; H04L 43/00; H04L 43/50; H04W 24/02; H04W 24/10; H04W 84/12; H04W 24/00; H04B 17/00; H04B 3/46  
USPC ......................................................... 370/252  
See application file for complete search history.

(56) References Cited

U.S. PATENT DOCUMENTS

| 9,351,122 | B1* | 5/2016 | Daniel | |
|---|---|---|---|---|
| 9,565,649 | B2* | 2/2017 | Venkatraman | H04W 24/08 |
| 2014/0126394 | A1* | 5/2014 | Stephens | H04W 56/0065 370/252 |
| 2014/0160959 | A1* | 6/2014 | Aldana | H04L 43/0864 370/252 |
| 2014/0254511 | A1* | 9/2014 | Aldana | H04W 56/003 370/329 |
| 2014/0355461 | A1* | 12/2014 | Aldana | G01S 5/00 370/252 |
| 2015/0139212 | A1* | 5/2015 | Wang | G01S 5/06 370/338 |
| 2015/0222602 | A1* | 8/2015 | Steiner | H04L 63/0428 713/168 |
| 2015/0271776 | A1* | 9/2015 | Michaelovich | H04W 64/00 455/456.1 |

(Continued)

OTHER PUBLICATIONS

IEEE STD 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Robert Lopata  
(74) *Attorney, Agent, or Firm* — Shichrur & Co.

(57) ABSTRACT

An apparatus to transmit a fine timing measurements (FTM) request from a first station to a second station. The FTM request including a request for suspending FTM measurements, if a threshold of movement has not been crossed since a last FTM measurement by the second station. The second station transmits in response to the FTM request a response including a motion indication of the second station.

25 Claims, 6 Drawing Sheets

(56) References Cited

U.S. PATENT DOCUMENTS

| | | | | |
|---|---|---|---|---|
| 2015/0365805 A1* | 12/2015 | Bajko | .................. | G01S 13/767 |
| | | | | 455/456.1 |
| 2016/0119805 A1* | 4/2016 | Aldana | ................ | H04L 43/106 |
| | | | | 370/252 |
| 2016/0202344 A1* | 7/2016 | Sanderovich | ............ | G01S 5/06 |
| | | | | 455/456.1 |
| 2016/0234704 A1* | 8/2016 | Aldana | ............... | H04L 43/0864 |
| 2016/0262122 A1* | 9/2016 | Aldana | ................ | H04W 24/10 |
| 2016/0366548 A1* | 12/2016 | Wang | .................. | H04W 64/00 |

OTHER PUBLICATIONS

Wi-Fi Alliance, Wi-Fi Peer-to-Peer (P2P) Technical Specification Version 1.5, Aug. 4, 2014, 183 pages.
Aldana et al., IEEE P802.11, Wireless LANs, CIDs 46,47,48 Regarding Fine Timing Measurement, 11-12-1249-02-000m, Oct. 2012, 17 pages.

* cited by examiner

METHOD, SYSTEM, AND APPARATUS OF RANGE MEASUREMENT IN A WIRELESS NETWORK

TECHNICAL FIELD

Some embodiments described herein generally relate to range measurement by wireless devices in a wireless network.

BACKGROUND

Range measurements in a wireless local area network (WLAN) may be performed using time of flight (ToF) and/or fine timing measurements (FTM) techniques to measure the range between a stationary station such as, for example, an access point (AP), or a mobile station operating as a responder, and another mobile station (MS) operating as an initiator.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

Figure 1:
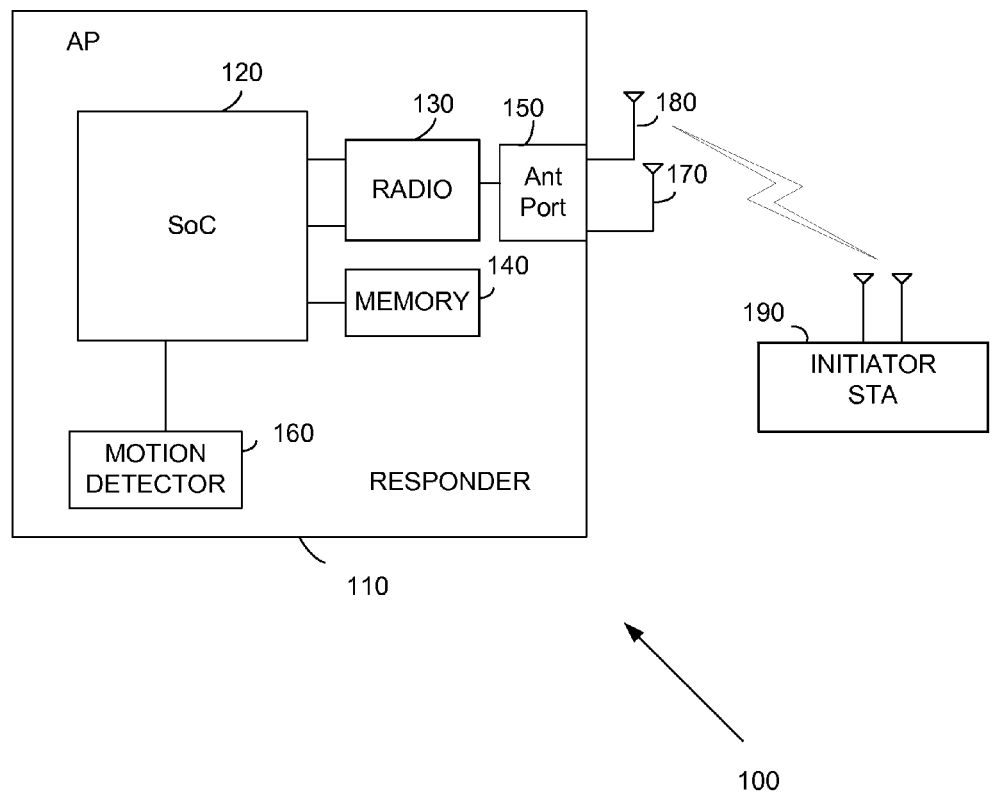
FIG. 1 is a schematic block diagram illustration of a wireless local area network, in accordance with some demonstrative embodiments.

Reference will now be made to the exemplary embodiments illustrated, and specific language will be used herein to describe the same. It will nevertheless be understood that no limitation of the scope of the disclosure is thereby intended.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a Personal Computer (PC), a desktop computer, a mobile computer, a laptop computer, a notebook computer, a tablet computer, an Ultrabook™ computer, a Smartphone device, a server computer, an Internet of Things (IoT) device, a sensor device, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wearable device, an Internet of Things (IoT) device, a wired or wireless network, a cellular network, a cellular node, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing institute of Electrical and Electronics Engineers (IEEE) 802.11 specifications, e.g., IEEE 802.11-2012, IEEE 802.11aa, IEEE 802.11b, IEEE 802.11ah, IEEE 802.11ac, "*IEEE 802.11-REVmc™/D4.0, January* 2015 *draft standard for Information technology—Telecommunications and information exchange between systems Local and metropolitan area networks Specific requirements; Part* 11*: Wireless LAN Medium Access Control (MAC) and Physical Layer (PHY)*

*Specification*", and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (Global Positioning System (GPS), Wireless Fidelity (Wi-Fi), Wi-Max, Zig-Bee™, Ultra-Wideband (UWB), and the like. Other embodiments may be used in various other devices, systems and/or networks.

The phrase "wireless device" and/or "mobile device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the phrase "wireless device" and/or "mobile device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "access point (AP), as used herein, may include an entity that contains a station (STA) and provides access to a distribution service, via a wireless medium (WM) for associated STAs.

The term "station (STA)", as used herein, may include a logical entity that is a singly addressable instance of medium access control (MAC) and physical layer (PHY) interface to the WM.

An initiator, for example, a MS capable of measuring range, may include motion detection capabilities. When measuring range, between the initiator and a responder, for example, an AP capable of measuring range, the initiator, e.g., the MS, may choose to stop measuring range, for example, when the initiator, e.g., the MS, becomes stationary.

However, in the case that the responder, e.g., the AP, is a non-stationary station, which is currently not moving, and the initiator is stationary, the initiator may keep measuring the range using the complete FTM procedure.

According to some demonstrative embodiments, APs, for example potentially non-stationary responders, and/or STAs, for example, initiators, may perform optimization of point to point (P2P) proximity/range determination use-cases of WiFi ToF/FTM.

For example, the optimization may include optimization of one or more operations of an FTM protocol. The responder may dynamically inform the initiator, e.g., the MS, that the responder, e.g., the AP, is currently still and/or stationary. The initiator may request a non-stationary responder to self-monitor the responder motion between FTM protocol transactions. In case of no movement detected between FTM protocol iterations, e.g., when a new request arrives, the responder may check if significant movement was detected from last ToF measurement. The responder, e.g., the AP, may report to the initiator "no movement", and the FTM protocol transaction may end, e.g., without measuring/reporting the actual ToF timers. The responder may perform a method to self-monitor responder motion/movement, e.g., between FTM protocol measurement requests from the initiator, although it should be understood that embodiments are not limited to this example.

Advantageously, optimization of the FTM protocol may significantly reduce the FTM protocol overhead, and/or may reduce the computation/power required for the FTM protocol transactions, e.g., bursts.

Reference is made to FIG. 1, which schematically illustrates a WLAN 100, in accordance with some demonstrative embodiments. For example WLAN 100 may include a responder 110 and an initiator 190. For example, responder 110 may include a mobile AP and/or initiator 190 may include a mobile STA.

According to some demonstrative embodiments, responder 110 may include, for example, a system on chip circuitry (SoC) 120, a radio circuitry 130, a memory circuitry 140, an antenna port 150, a motion detector circuitry 160, and/or antennas 170 and/or 180.

For example, SoC 120 may include circuitry and/or logic of a single core processor, a dual core processor, a triple core processor, a quadrature core processor, a multiple core processor, or the like. In addition, SoC 120 may include circuitry and/or a logic of an application processor, a baseband processor, a MAC processor, or the like.

In some demonstrative embodiments, one or more elements of SoC may be configured to perform one or more functionalities, operations and/or communications of responder 110, e.g., as described herein.

Responder 110 may include circuitry and/or logic, which may operate according to the IEEE 802.11n standard, the IEEE 802.11-2012 standard, the IEEE 802.11ac-2013 standard, IEEE 802.11REVmc standard, or the like. Memory 140 may include circuitry and/or logic of a Flash memory, a non-volatile memory, a volatile memory, or the like.

According to some demonstrative embodiments, for example, radio circuitry 130 may include a transmitter circuitry, a receiver circuitry, a multiple input multiple output (MIMO) antenna system, a baseband circuitry, or the like. Motion detector 160 may include a motion sensor such as, for example, a gyroscope, a Global Positioning System (GPS) receiver, an accelerometer, an inertial navigation system (INS) receiver, an inertial measurement unit (IMU), or the like.

According to some demonstrative embodiments, for example, initiator 190 may be included in a mobile device, a mobile phone, a tablet, wearable devices, navigation devices, a laptop computer, a desktop computer, an Internet of Things (IoT) device, a sensor device, or the like. For example, initiator 190 may include a SoC, a radio, a memory, a motion detector, an antenna port, and/or one or more antennas.

According to some demonstrative embodiments, for example, initiator 190 may include one or more elements of responder 110 and/or may have a similar architecture as the exemplary architecture of responder 110.

According to some demonstrative embodiments, initiator 190 may be configured as a mobile station. For example, initiator 190 may be included in Internet of Things (IoT) device, such as, for example, a watch, eyeglasses, a bracelet, and the like. Furthermore, initiator 190 may be included in mobile phones, tablets, laptop computers, music players, mobiles TV, and the like.

According to some demonstrative embodiments, for example, initiator 190 may request responder 110 to perform range measurements with initiator 190. For example, the range measurements may be performed using time of flight (ToF) techniques and/or methods, if desired. ToF may also be referred as fine time measurements (FTM), if desired.

According to some demonstrative embodiments, initiator 190 may transmit an FTM request to responder 110, the FTM request may include a request for suspending and/or skipping and/or terminating a FTM measurements session, for example, if a threshold of movement ("movement threshold") has not been crossed, e.g., since a last FTM measurement session by responder 110. Responder 110 may send an acknowledgment (ACK) frame to initiator 190, e.g., in response to the FTM request. Responder 110 may send an FTM response including a motion indication of responder 110.

According to one demonstrative embodiments, motion detector 160 of responder 110 may detect no motion above the movement threshold, for example, since the last FTM measurement, and responder 110 may send an FTM frame to initiator 190. The FTM frame may include a non-motion ("no motion") indication. Initiator 190 may suspend the FTM measurements, for example, if the no motion indication is to indicate no movement of responder 110, e.g., since the last FTM measurement.

According to some demonstrative embodiments, the FTM request may include a motion threshold field, the motion threshold field may include a threshold value. For example, the threshold value may include a value of distance, for example, in meters, centimeters, feet and/or inches, and/or any other metric. The motion threshold field may indicate a movement threshold of responder 110. Initiator 190 may set the threshold value in the motion threshold field.

In some demonstrative embodiments, for example, the FTM request may include a suspend FTM request indicator, e.g., in the form of a flag/field. The suspend FTM request flag/field may include a request for suspending FTM measurements, for example, when the threshold of movement has not been crossed, e.g., since the last FTM measurement by responder 110.

According to some demonstrative embodiments, the FTM procedure may include one or more stages, e.g., three stages. For example, the FTM procedure may include a first stage, which may include a negotiation stage, a second stage, which may be a measurement stage, and/or a third stage, which may be termination of the FTM. For example, initiator 190 may determine a motion of responder 110 at the negotiation stage of the FTM procedure, and initiator 190 and responder 110 may perform the measurement stage of the FTM procedure, for example, if responder 110 moves, if desired.

According to some demonstrative embodiments, responder 110 and initiator 190 may perform the measurement stage of the FTM procedure, for example, if initiator 190 is stationary and responder 110 has moved since the last FTM measurement session.

According to some demonstrative embodiments, responder 110 and initiator 190 may perform the measurement stage of the FTM procedure, for example, if responder 110 and initiator 190 are moving, although it should be understood that the embodiments are not limited to this example.

Figure 2:
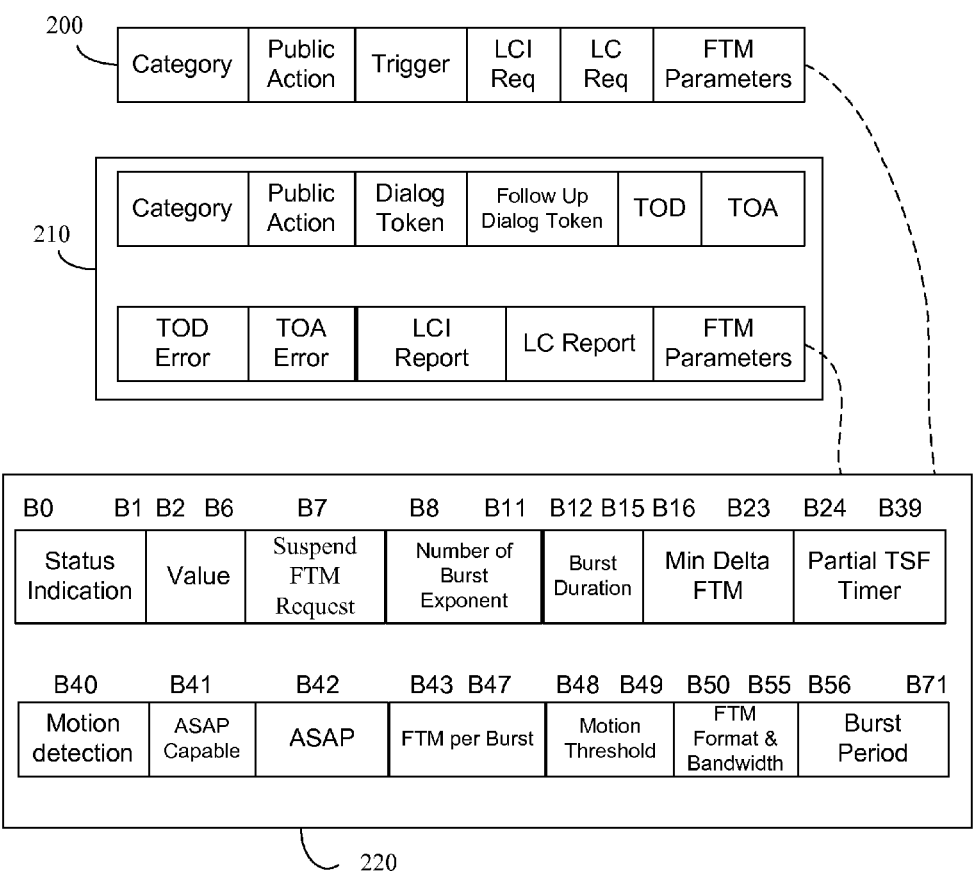
FIG. 2 is a schematic illustration of a fine time measurements (FTM) request frame, an FTM frame, and an FTM parameters element, in accordance with some demonstrative embodiments.

Reference is made to FIG. 2, which schematically illustrates a fine time measurements (FTM) request frame 200, an FTM frame 210 and an FTM parameters element 220, in accordance with some demonstrative embodiments.

For example, FTM frame 200 may include a category field, a public action field, a trigger filed, and, optionally, FTM frame 200 may include a location configuration information (LCI) measurement request filed, a location civic (LC) measurement request filed, and/or an FTM parameters element 220.

According to some demonstrative embodiments, FTM frame 210 may include a category field, a public action field, a dialog token field, a follow up dialog token field, a time of departure (TOD) field, a time of arrival (TOA) field, a TOD error filed, and/or a TOA error filed. For example, FTM frame 200 may optionally include an LCI report frame, an LC report frame, and/or an FTM parameters element 220.

According to some demonstrative embodiments, FTM parameters elements 220 may include a 2-bit status indication field, e.g., including bits B0-B1, a 5-bit value field, e.g., including bits B2-B6, a 1-bit suspend FTM request field, e.g., including a bit B7, a 4-bit number of burst exponent field, e.g., including bits B8-B11, a 4-bit burst duration field, e.g., including bits B12-B15, an 8-bit minimum delta FTM field, e.g., including bits B16-B23, a 16-bit partial TSF timer field, e.g., including bits B24-B39, a 1-bit motion detection field, e.g., including a bit B40, a 1-bit ASAP capable field, e.g., including a bit B41, a 1-bit ASAP field, e.g., including a bit B42, a 5-bit FTMs per burst field, e.g., including bits B43-B47, a 2-bit motion threshold field, e.g., including bits B48-B49, a 6-bit FTM format and bandwidth field, e.g., including bits B50-B55, and/or a 16-bit burst period field, e.g., including bits B56-B71. In other embodiments, one or more of the fields of FTM parameters elements 220 may have any other size, and/or may include any other additional or alternative fields.

According to some demonstrative embodiments, the initiator, e.g., initiator 190 (FIG. 1), may send FTM request frame 200 with the suspend FTM request field of FTM parameters element 220. The suspend FTM request field may include a predefined value, e.g., the value 1, for example, to indicate that the initiator requests to suspend an FTM session, for example, if and/or when the threshold value at the motion threshold field has not been crossed. For example, the value "00" at the motion threshold field of FTM parameters element 220 may indicate 0 meters, the value "01" of the motion threshold field may indicate 1 meter, the value "10" of the motion threshold field may indicate 2 meters, and/or the value "11" of the motion threshold field may indicate 3 meters. In another embodiment, for example, the value "00" at the motion threshold field of FTM parameters element 220 may indicate 0 meters, the value "01" of the motion threshold field may indicate 0.5 meter, the value "10" of the motion threshold field may indicate 1.5 meters, and/or the value "11" of the motion threshold field may indicate 2 meters. In an additional embodiment, the value "00" at the motion threshold field of FTM parameters element 220 may indicate 0 meters, the value "01" of the motion threshold field may indicate 0.25 meter, the value "10" of the motion threshold field may indicate 0.5 meters, and/or the value "11" of the motion threshold field may indicate 1 meter. It should be understood that in other embodiments the value of the motion threshold field may be in other metric scales and/or in non-metric scales, and/or may include other distance indications than the above mentioned examples, if desired.

According to some demonstrative embodiments, the responder e.g., responder 110 (FIG. 1), may send, e.g., in response to FTM request, FTM frame 200 with a value in the motion detection field of FTM parameters element 220. For example, a first value, e.g., a value "1", may indicate no motion detected since last FTM measurement, and/or a second value, e.g., a value "0", may indicate motion is detected since last FTM measurement, or vise versa.

Figure 3:
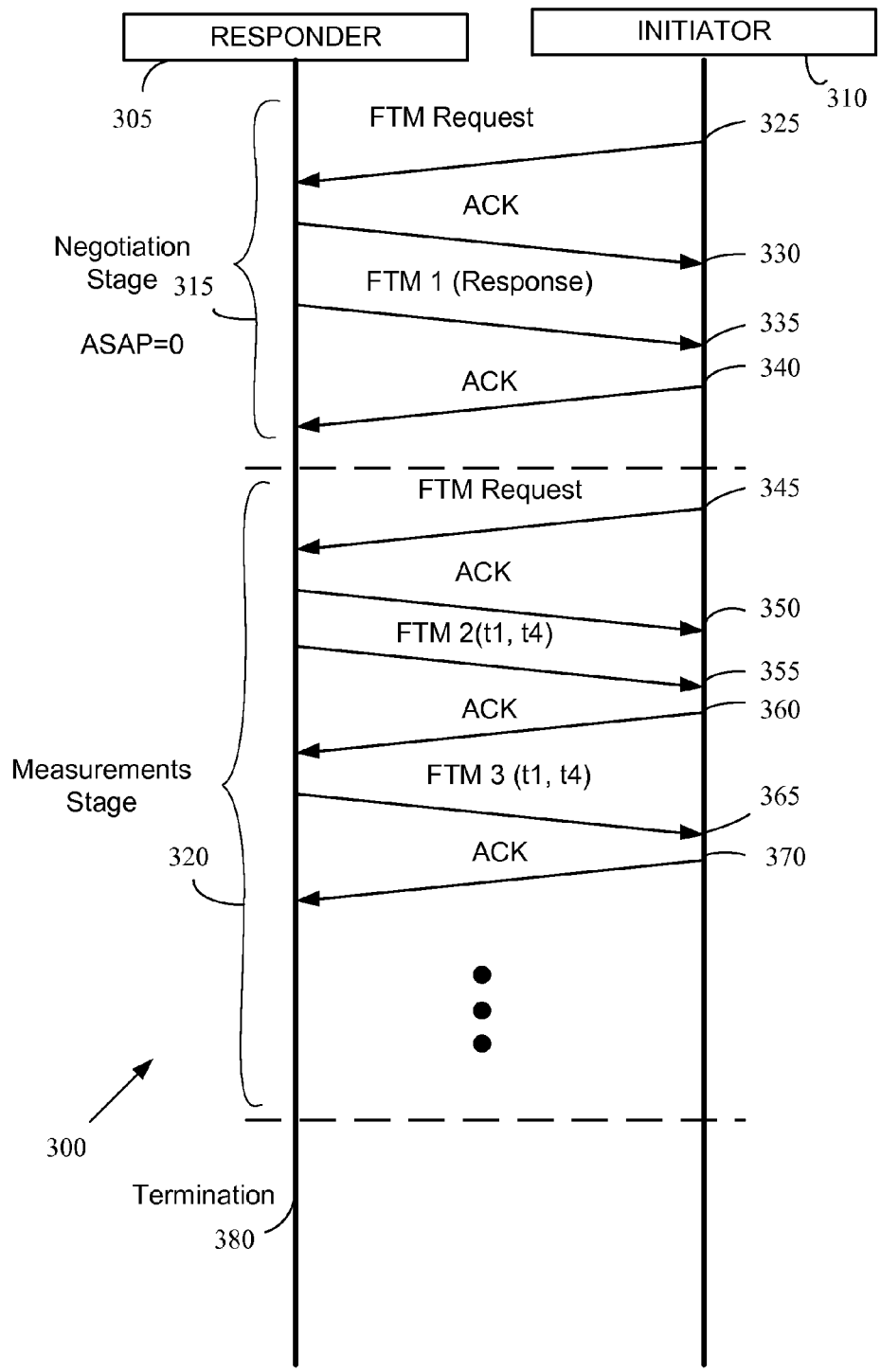
FIG. 3 is a schematic illustration of an FTM frame exchange session when an As-Soon-As-Possible (ASAP) field is set to 0, in accordance with some demonstrative embodiments.

Reference is made to FIG. 3, which schematically illustrates an FTM frame exchange session 300, for example, when the ASAP field is set to 0, in accordance with some demonstrative embodiments. For example, in a non-ASAP mode, e.g., ASAP=0, the FTM exchange session may have three stages, e.g., including a negotiation stage 315, a measurement stage 320, and/or a termination stage 380.

According to some demonstrative embodiments, the FTM procedure may be used to measure a distance and/or range between an initiator 310 and a responder 305. For example, initiator 310 may measure the distance and/or range to two or more responders, for example, in order to determine a location of initiator 310, e.g., by using trilateration, triangulation, or the like.

For example, at negation stage 315, initiator 310 may send an FTM request frame 325 to responder 305. FTM request frame 325 may include a suspend FTM request field (FIG. 2), and a motion threshold field (FIG. 2), although it should understood that the demonstrative embodiments are not limited to this example.

For example, the suspend request field may indicate a request to suspend the FTM measurements, e.g., when no motion of responder 305 is detected since a last FTM measurement. A value of the motion threshold field may be used to determine a motion or a no motion state of responder 305. For example, if the threshold value in the motion threshold field has not been crossed, it may indicate no motion of responder 305. If the threshold value in the motion threshold field has been crossed, it may indicate motion of responder 305.

According to some demonstrative embodiments, responder 305 may send an acknowledgment (ACK) frame 330, e.g., in response to FTM request 325, and a FTM frame 335, denoted FTM 1. For example, FTM frame 335 may include a motion detection field/flag to indicate a motion of responder 305. Initiator 310 may respond, for example, by sending an ACK frame 340.

According to some demonstrative embodiments, measurements stage 320 may be performed, for example, if responder 305 had moved since the last FTM measurement and/or initiator 310 is stationary; if both responder 305 and initiator 310 have moved since the last FTM measurement; and/or if initiator 310 is mobile and responder 305 is stationary and successfully negotiated for FTM.

For example, at measurement stage 320, initiator 310 may send an FTM request 345 to responder 305. The FTM request 345 may include a request to provide time of arrival (TOD) and time of departure (TOD) times. Responder 305 may respond with an ACK 350, e.g., followed by a second FTM frame 355, denoted FTM 2, which may include TOA and TOD values of t1 and t4, respectively. Initiator 310 may send an ACK 360, and responder 305 may send a third FTM frame 365, denoted FTM 3, with time stamps t1 and t4 of the TOD and TOA, followed by an ACK 370 from initiator 310.

According to some demonstrative embodiments, the FTM session may continue with exchange of more measurement frames, or may terminate, e.g., at termination stage 380.

Figure 4:
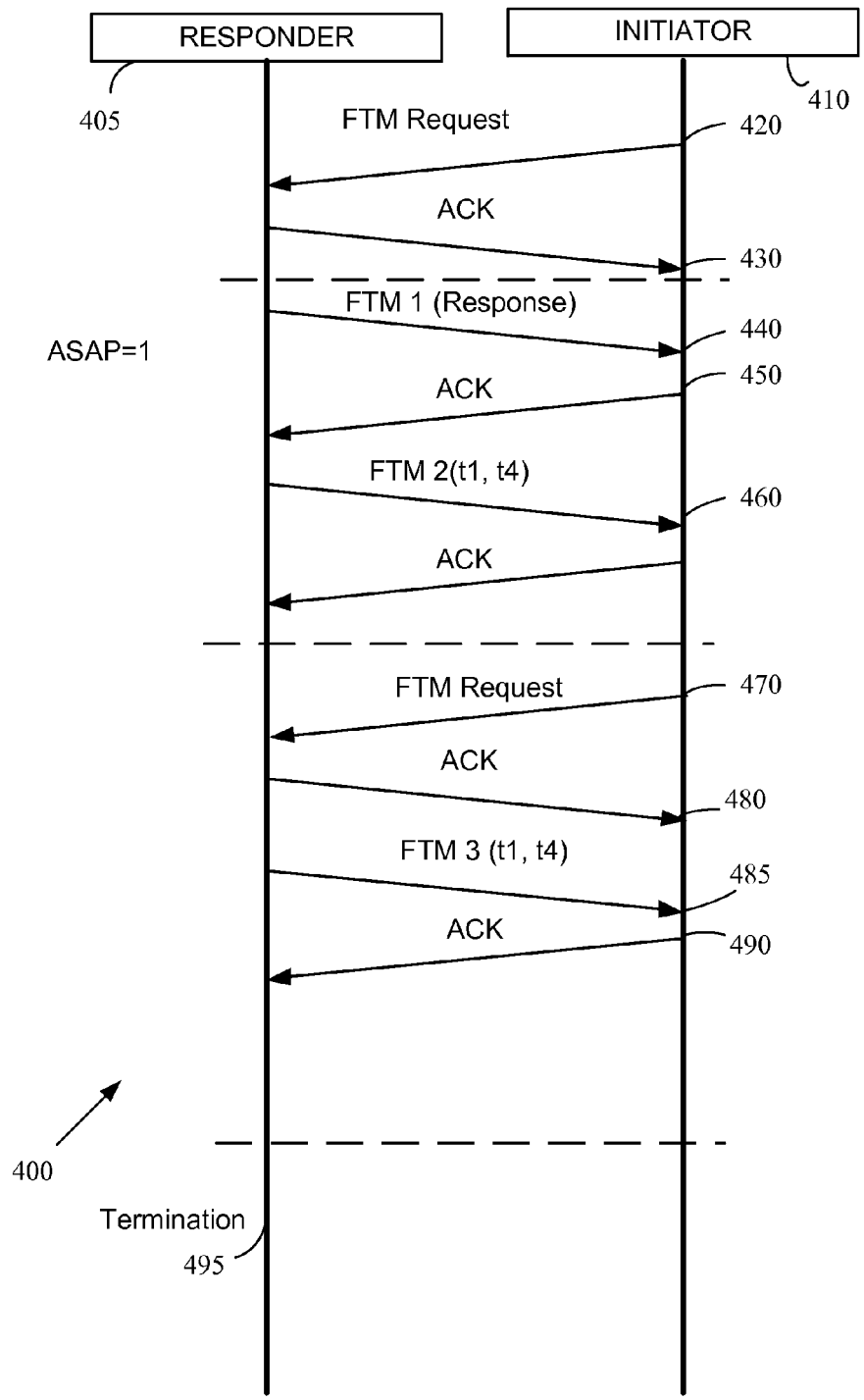
FIG. 4 is a schematic illustration of an FTM frame exchange session when the ASAP field is set to 1, in accordance with some demonstrative embodiments

Reference is made to FIG. 4, which schematically illustrates an FTM frame exchange session 400, when ASAP is set to 1, in accordance with some demonstrative embodiments.

For example, in an ASAP mode, e.g., ASAP=1, an initiator 410 may send an FTM request frame 420 to a responder 405. FTM request frame 420 may include a suspend FTM request field (FIG. 2), and a motion threshold field (FIG. 2).

For example, the suspend FTM request field may indicate a request to suspend the FTM measurements, e.g., when no motion of responder 405 is detected, e.g., since a last FTM measurement. A value of the motion threshold field may be used to determine a motion or a no motion state of responder 405. For example, if the threshold value in the motion threshold field has not been crossed, it may indicate no motion of responder 405. If the threshold value in the motion threshold field has been crossed, it may indicate motion of responder 405.

According to some demonstrative embodiments, responder 405 may send an ACK frame 430, e.g., in response to FTM request 420, and a FTM frame (e.g., FTM 1) 440, and initiator 410 may respond with an ACK. For example, FTM frame 440 may include a motion detection field/flag to indicate a motion of responder 405. For example, FTM measurements may not be suspended, e.g., if responder 405 has moved since a last FTM measurement and/or if initiator 410 is stationary; if both responder 405 and initiator 410 have moved since the last FTM measurement; and/or if initiator 410 is mobile and responder 405 is stationary and successfully negotiated for FTM.

According to some demonstrative embodiments, the FTM measurements may continue by responder 405 sending a second FTM frame (e.g., FTM 2) including TOA and TOD values, e.g., t1, and t2. Initiator 410 may send an ACK 460.

According to some demonstrative embodiments, an additional burst of FTM measurements may be performed. For example, initiator 410 may send an FTM request 470. The FTM request 470 may include a request to provide TOA and TOD values. Responder 405 may send an ACK 480 followed by a third FTM frame 485 (e.g., FTM 3) with time stamps t1 and t4 of the TOD and TOA, followed by ACK 490 from initiator 410.

According to some demonstrative embodiment, the FTM session may continue with one or more exchanges of measurement frames, or may terminate 495.

Figure 5:
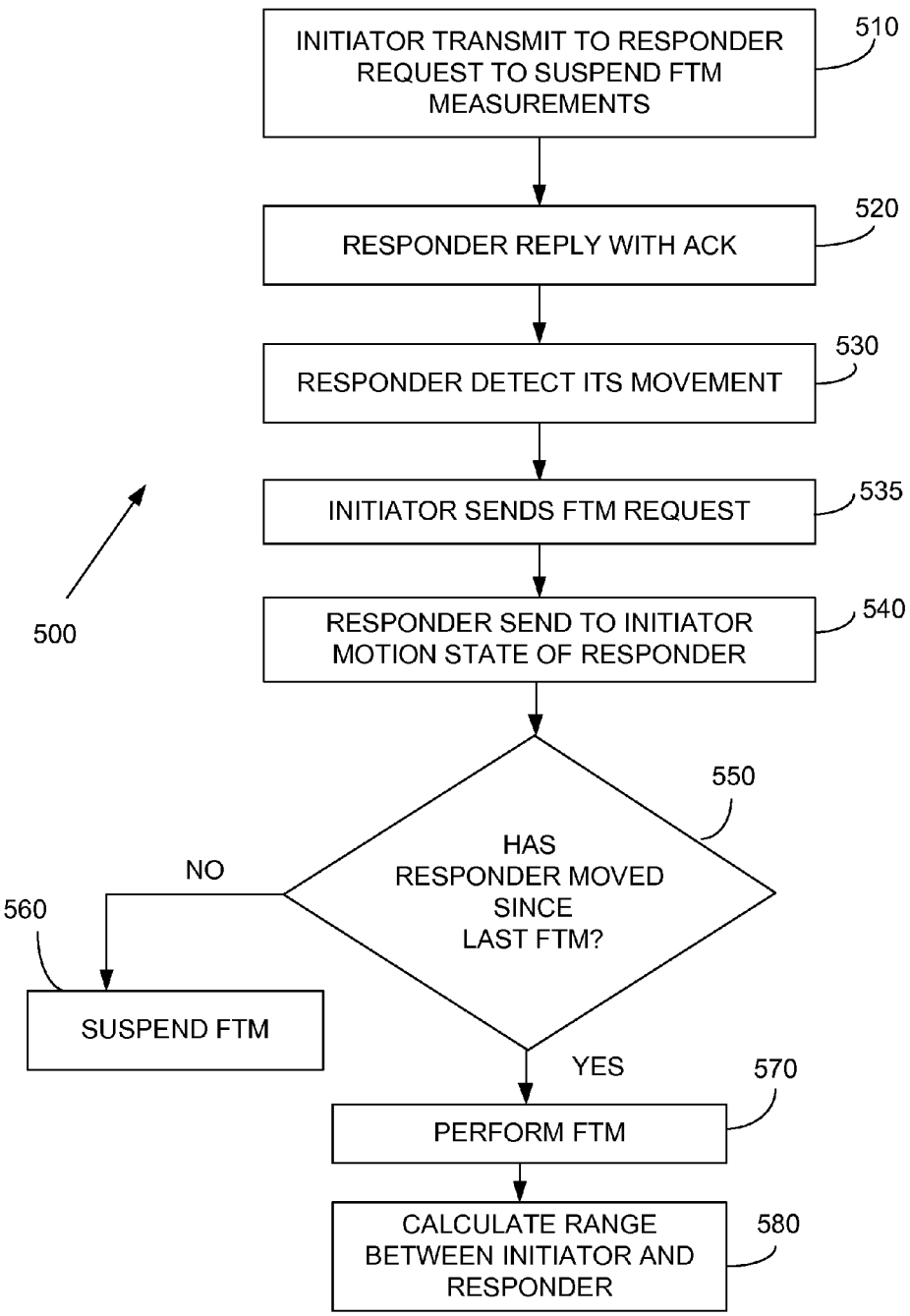
FIG. 5 is a schematic flow-chart illustration of a method of measuring a range between two stations, in accordance with some demonstrative embodiments.

Reference is made to FIG. 5, which schematically illustrates a method of measuring range between two stations 500, in accordance with some demonstrative embodiments. The method may start with an initiator, for example initiator 310 of FIG, transmitting an FTM request (e.g., FTM request 325) to a responder (e.g., responder 305 of FIG. 3). For example the FTM request may include a request to suspend FTM measurements, if a motion threshold has not been crossed since a last FTM measurement by the responder (text box 510).

According to some demonstrative embodiments, the responder may replay by sending ACK frame (text box 520). For example, the responder may include a motion detector (e.g., motion detector 160 of FIG. 1). The responder may detect its own movement using the motion detector (text box 530). The initiator may send FTM request (text box 535). The responder may send to the initiator an FTM frame. The FTM frame may include the motion state of the responder (text box 540).

According to some demonstrative embodiments, if the responder moved since last FTM protocol iteration and a motion threshold has not been crossed (diamond 550) then the FTM protocol iterations may be suspended (text box 560). Otherwise, the initiator and the responder may perform time measurements according to the FTM protocol (text box 570). The initiator and/or the responder may calculate the range based on the time measurements (text box 580).

Figure 6:
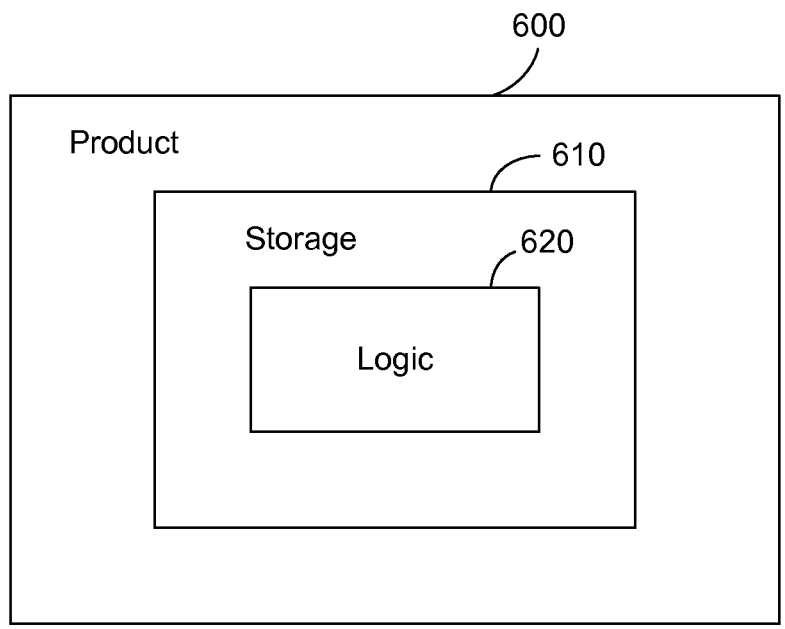
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 610 to store logic 620, which may be used, for example, to perform at least part of the functionality of one or more elements of responder 110 (FIG. 1), one or more elements of initiator 190 (FIG. 1), and/or to perform one or more operations of the FTM procedure of FIG. 3 and/or FIG. 4, and/or one or more of the operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 610 may include one or more types of computer-readable storage media capable of storing data, including volatile memory, non-volatile memory, removable or non-removable memory, erasable or non-erasable memory, writeable or re-writeable memory, and the like. For example, machine-readable storage medium 610 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, a card, a magnetic card, an optical card, a memory card, a disk on key, a SIM card, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 620 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 620 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example may be referred to herein along with alternatives for the various components thereof. It is understood that such embodiments, examples, and alternatives are not to be construed as defacto equivalents of one another, but are to be considered as separate and autonomous representations.

Furthermore, the described features, structures, or characteristics may be combined in any suitable manner in one or more embodiments.

EXAMPLES

The following examples pertain to further embodiments.

Example 1 includes an apparatus comprising circuitry to cause a first station to transmit a fine timing measurements (FTM) request to a second station, the FTM request comprises a request to suspend FTM measurements when a motion threshold has not been crossed since a last FTM measurement by the second station; to process a received acknowledgment (ACK) from the second station in response to the FTM request; and to process a received FTM frame from the second station, the FTM frame comprising a motion detection field to indicate a motion state of the second station.

Example 2 includes the subject matter of Example 1, and optionally, the apparatus is being configured to cause the first station to suspend the FTM measurements when the motion detection field is to indicate a non-motion state of the second station since the last FTM measurement.

Example 3 includes the subject matter of Example 1 or 2, and optionally, wherein the FTM request comprises a motion threshold field, the motion threshold field comprising the motion threshold.

Example 4 includes the subject matter of any one of Examples 1-3, and optionally, wherein the motion threshold is a distance threshold.

Example 5 includes the subject matter of any one of Examples 1-4, and optionally, wherein the FTM request comprises a suspend FTM request field, the suspend FTM request field comprises an indication of the request to suspend FTM measurements.

Example 6 includes the subject matter of any one of Examples 1-5, and optionally, the apparatus is configured to cause the first station to determine a motion of the second station at a negotiation stage of the FTM procedure.

Example 7 includes the subject matter of any one of Examples 1-6, and optionally, the apparatus is configured to cause the first station to perform a measurement stage of the FTM procedure when the motion indication indicates that second station moved since the last FTM measurement.

Example 8 includes the subject matter of any one of Examples 1-7, and optionally, the apparatus is configured to cause the first station to perform a measurement stage of the FTM procedure when the first station is stationary and the second station is moving.

Example 9 includes the subject matter of any one of Examples 1-8, and optionally, the apparatus is configured to cause the first station to perform a measurement stage of the FTM procedure if both the first station and the second station are moving.

Example 10 includes the subject matter of any one of Examples 1-9, and optionally, wherein the first station is configured to operate as an initiator.

Example 11 includes the subject matter of any one of Examples 1-10, and optionally, the apparatus comprising a system on chip (SoC) circuitry operably coupled to a radio circuitry; a motion detector operably coupled to the SoC; a memory operably coupled to the SoC; an antenna port operably coupled to the radio circuitry; and at least one antenna operably coupled to the antenna port.

Example 12 includes an apparatus comprising circuitry to cause a first station to process a received fine timing measurements (FTM) request from a second station, the FTM request comprises a request to suspend FTM measurements when a motion threshold has not been crossed since a last FTM measurement by the first station; to send an acknowledgment (ACK) to the second station in response to the FTM request; and to send an FTM response frame to the second station, the FTM response frame comprising a motion detection field to indicate a motion state of the first station.

Example 13 includes the subject matter of Example 12, and optionally, the apparatus is configured to cause the first station to suspend the FTM measurements when the motion detection field is to indicate a non-motion state of the second station since the last FTM measurement.

Example 14 includes the subject matter of Example 12 or 13, and optionally, wherein the FTM request comprises a motion threshold field, the motion threshold field comprising the motion threshold.

Example 15 includes the subject matter of any one of Examples 12-14, and optionally, wherein the motion threshold is a distance threshold.

Example 16 includes the subject matter of any one of Examples 12-15, and optionally, wherein the FTM request comprising a suspend FTM request field, the suspend FTM request field comprises an indication of the request to suspend FTM measurements.

Example 17 includes the subject matter of any one of Examples 12-16, and optionally, the apparatus being configured to cause the first station to determine a motion of the second station at a negotiation stage of the FTM procedure.

Example 18 includes the subject matter of any one of Examples 12-17, and optionally, being configured to cause the first station to perform a measurement stage of the FTM procedure when the first station moves since the last FTM measurement.

Example 19 includes the subject matter of any on of Examples 12-18, and optionally, wherein the first station is configured to operate as a responder.

Example 20 includes the subject matter of any one of Examples 12-19, and optionally, wherein the first station comprising a movement detector.

Example 21 includes a computer program product comprising one or more tangible computer readable non-transitory storage media comprising computer-executable instructions operable to, when executed by at least one computer processor to result in processing a fine timing measurements (FTM) request to be transmitted to a second station, the FTM request comprises a suspend FTM request field and a motion threshold field; processing an acknowledgment (ACK) received from the second station in response to the FTM request; processing a received FTM frame from the second station, the FTM frame comprising a motion detection field to indicate a motion of the second station; and suspending FTM measurements when the motion detection field is to indicate a non-motion state of the second station since the last FTM measurement.

Example 22 includes the subject matter of Example 21, and optionally, wherein the motion threshold is a distance threshold.

Example 23 includes the subject matter of Example 21 or 22, and optionally, wherein the suspend FTM request field comprises an indication of the request to suspend FTM measurements.

Example 24 includes the subject matter of any one of Examples 21-23, and optionally, wherein the instructions when executed result in determining a motion of the second station at a negation stage of the FTM procedure.

Example 25 includes the subject matter of any one of Examples 21-24, and optionally, wherein the instructions when executed result in performing a measurement stage of the FTM procedure when the second station moves since the last FTM measurement.

Example 26 includes a computer program product comprising one or more tangible computer readable non-transitory storage media comprising computer-executable instructions operable to, when executed by at least one computer processor to result in processing a received fine timing measurements (FTM) request from a second station, the FTM request comprises a request to suspend FTM measurements when a motion threshold has not been crossed since a last FTM measurement by the first station; sending an acknowledgment (ACK) to the second station in response to the FTM request; and sending an FTM response frame to the second station, the FTM response frame comprising a motion detection field to indicate a motion state of the first station.

Example 27 includes the subject matter of Example 26, and optionally, wherein the instructions when executed result in suspending the FTM measurements when the motion detection field is to indicate a non-motion state of the second station since the last FTM measurement.

Example 28 includes the subject matter of Example 26 or 27, and optionally, wherein the FTM request comprises a motion threshold field, the motion threshold field comprising the motion threshold.

Example 29 includes the subject matter of any one of Examples 26-28, and optionally, wherein the motion threshold is a distance threshold.

Example 30 includes the subject matter of any one of Examples 26-29, and optionally, wherein the FTM request comprising a suspend FTM request field, the suspend FTM request field comprises an indication of the request to suspend FTM measurements.

Example 31 includes the subject matter of any one of Examples 26-30, and optionally, wherein the instructions when executed result in determining a motion of the second station at a negotiation stage of the FTM procedure.

Example 32 includes the subject matter of any one of Examples 26-31, and optionally, wherein the instructions when executed result in performing a measurement stage of the FTM procedure when the first station moves since the last FTM measurement.

Example 33 includes the subject matter of any one of Examples 26-32, and optionally, wherein the first station is configured to operate as a responder.

Example 34 includes the subject matter of any one of Examples 26-33, and optionally, wherein the first station comprising a movement detector.

Example 35 includes a method of measuring distance by a first station to a second station, the method comprising: transmitting a fine timing measurements (FTM) request to the second station, the FTM request comprises a request to suspend FTM measurements when a motion threshold has not been crossed since a last FTM measurement by the second station; receiving an acknowledgment (ACK) from the second station in response to the FTM request; and receiving an FTM frame from the second station, the FTM frame comprising a motion detection field to indicate a motion state of the second station.

Example 36 includes the subject matter of Example 35, and optionally, comprising suspending the FTM measurements when the motion detection field is to indicate a non-motion state of the second station since the last FTM measurement.

Example 37 includes the subject matter of Example 35 or 36, and optionally, wherein the FTM request comprises a motion threshold field, the motion threshold field comprising the motion threshold.

Example 38 includes the subject matter of any one of Examples 35-37, and optionally, wherein the motion threshold is a distance threshold.

Example 39 includes the subject matter of any one of Examples 35-38, and optionally, wherein the FTM request comprises a suspend FTM request field, the suspend FTM request field comprises an indication of the request to suspend FTM measurements.

Example 40 includes the subject matter of any one of Examples 35-39, and optionally, comprising determining a motion of the second station at a negotiation stage of the FTM procedure.

Example 41 includes the subject matter of any one of Examples 35-40, and optionally, comprising performing a measurement stage of the FTM procedure when the motion indication indicates that the second station moved since the last FTM measurement.

Example 42 includes the subject matter of any one of Examples 35-41, and optionally, comprising performing a measurement stage of the FTM procedure when the first station is stationary and the second station is moving.

Example 43 includes the subject matter of any one of Examples 35-42, and optionally, comprising performing a measurement stage of the FTM procedure if both the first station and the second station are moving.

Example 44 includes the subject matter of any one of Examples 35-43, and optionally, wherein the first station is configured to operate as an initiator.

Example 45 includes a method of measuring distance by a first station to a second station, the method comprising receiving a fine timing measurements (FTM) request from a second station, the FTM request comprises a request to suspend FTM measurements when a motion threshold has not been crossed since a last FTM measurement by the first station; sending an acknowledgment (ACK) to the second station in response to the FTM request; and sending an FTM response frame to the second station, the FTM response frame comprising a motion detection field to indicate a motion state of the first station.

Example 46 includes the subject matter of Example 45, and optionally, comprising suspending the FTM measurements when the motion detection field is to indicate a non-motion state of the second station since the last FTM measurement.

Example 47 includes the subject matter of Example 45 or 46, and optionally, wherein the FTM request comprises a motion threshold field, the motion threshold field comprising the motion threshold.

Example 48 includes the subject matter of any one of Examples 45-47, and optionally, wherein the motion threshold is a distance threshold.

Example 49 includes the subject matter of any one of Examples 45-48, and optionally, wherein the FTM request comprising a suspend FTM request field, the suspend FTM request field comprises an indication of the request to suspend FTM measurements.

Example 50 includes the subject matter of any one of Examples 45-49, and optionally, comprising determining a motion of the second station at a negotiation stage of the FTM procedure.

Example 51 includes the subject matter of any one of Examples 45-50, and optionally, comprising performing a measurement stage of the FTM procedure when the first station moves since the last FTM measurement.

Example 52 includes the subject matter of any one of Examples 45-51, and optionally, wherein the first station is configured to operate as a responder.

Example 53 includes the subject matter of any one of Examples 45-52, and optionally, wherein the first station comprising a movement detector.

Example 54 includes a first station configured to measure range to a second station, the first station comprising a transmitter configured to transmit a fine timing measurements (FTM) request to a second station, the FTM request comprises a request to suspend FTM measurements when a motion threshold has not been crossed since a last FTM measurement by the second station; and a receiver configured to receive an acknowledgment (ACK) from the second station in response to the FTM request, and to receive an FTM frame from the second station, the FTM frame comprising a motion detection field to indicate a motion state of the second station.

Example 55 includes the subject matter of Example 54, and optionally, comprising a system on chip configured to suspend the FTM measurements when the motion detection field is to indicate a non-motion state of the second station since the last FTM measurement.

Example 56 includes the subject matter of Example 54 or 55, and optionally, wherein the FTM request comprises a motion threshold field, the motion threshold field comprising the motion threshold.

Example 57 includes the subject matter of any one of Examples 54-56, and optionally, wherein the motion threshold is a distance threshold.

Example 58 includes the subject matter of any one of Examples 54-57, and optionally, wherein the FTM request comprises a suspend FTM request field, the suspend FTM request field comprises an indication of the request to suspend FTM measurements.

Example 59 includes the subject matter of any one of Examples 54-58, and optionally, the first station being configured to determine a motion of the second station at a negotiation stage of the FTM procedure.

Example 60 includes the subject matter of any one of Examples 54-59, and optionally, the first station being configured to perform a measurement stage of the FTM procedure when the motion indication indicates that second station moved since the last FTM measurement.

Example 61 includes the subject matter of any one of Examples 54-60, and optionally, the first station being configured to perform a measurement stage of the FTM procedure when the first station is stationary and the second station is moving.

Example 62 includes the subject matter of any one of Examples 54-61, and optionally, the first station being configured to perform a measurement stage of the FTM procedure if both the first station and the second station are moving.

Example 63 includes the subject matter of any one of Examples 54-62, and optionally, the first station is configured to operate as an initiator.

Example 64 includes a first station configured to measure range to a second station, the first station comprising a receiver to receive a fine timing measurements (FTM) request from a second station, the FTM request comprises a request to suspend FTM measurements when a motion threshold has not been crossed since a last FTM measurement by the first station; and a transmitter configured to transmit an acknowledgment (ACK) to the second station in response to the FTM request, and to transmit an FTM response frame to the second station, the FTM response frame comprising a motion detection field to indicate a motion state of the first station.

Example 65 includes the subject matter of Example 64, and optionally, comprising a system-on-chip configured to suspend the FTM measurements when the motion detection field is to indicate a non-motion state of the second station since the last FTM measurement.

Example 66 includes the subject matter of Example 64 or 65, and optionally, wherein the FTM request comprises a motion threshold field, the motion threshold field comprising the motion threshold.

Example 67 includes the subject matter of any one of Examples 64-66, and optionally, wherein the motion threshold is a distance threshold.

Example 68 includes the subject matter of any one of Examples 64-67, and optionally, wherein the FTM request comprising a suspend FTM request field, the suspend FTM request field comprises an indication of the request to suspend FTM measurements.

Example 69 includes the subject matter of any one of Examples 64-68, and optionally, wherein the first station is configured to determine a motion of the second station at a negotiation stage of the FTM procedure.

Example 70 includes the subject matter of any one of Examples 64-69, and optionally, wherein the first station is configured to perform a measurement stage of the FTM procedure when the first station moves since the last FTM measurement.

Example 71 includes the subject matter of any one of Examples 64-70, and optionally, the first station is configured to operate as a responder.

Example 72 includes the subject matter of any one of Examples 64-71, and optionally, the first station comprising a movement detector.

Example 73 includes a first station configured to measure range to a second station, the first station comprising means to transmit a fine timing measurements (FTM) request to a second station, the FTM request comprises a request to suspend FTM measurements when a motion threshold has not been crossed since a last FTM measurement by the second station; and means to receive an acknowledgment (ACK) from the second station in response to the FTM request, and to receive an FTM frame from the second station, the FTM frame comprising a motion detection field to indicate a motion state of the second station.

Example 74 includes the subject matter of Example 73, and optionally, comprising means to suspend the FTM measurements when the motion detection field is to indicate non-motion state of the second station since the last FTM measurement.

Example 75 includes the subject matter of Example 73 or 74, and optionally, wherein the FTM request comprises a motion threshold field, the motion threshold field comprising the motion threshold.

Example 76 includes the subject matter of any one of Examples 73-75, and optionally, wherein the motion threshold is a distance threshold.

Example 77 includes the subject matter of any one of Examples 73-76, and optionally, wherein the FTM request comprises a suspend FTM request field, the suspend FTM request field comprises an indication of the request to suspend FTM measurements.

Example 78 includes the subject matter of any one of Examples 73-77, and optionally, comprising means to determine a motion of the second station at a negotiation stage of the FTM procedure.

Example 79 includes the subject matter of any one of Examples 73-78, and optionally, comprising means to perform a measurement stage of the FTM procedure when the motion indication indicated that the second station moved since the last FTM measurement.

Example 80 includes the subject matter of any one of Examples 73-79, and optionally, comprising means to perform a measurement stage of the FTM procedure when the first station is stationary and the second station is moving.

Example 81 includes the subject matter of any one of Examples 73-80, and optionally, comprising means to perform a measurement stage of the FTM procedure if both the first station and the second station are moving.

Example 82 includes the subject matter of any one of Examples 73, and optionally, comprising means to operate as an initiator.

Example 83 includes a first station configured to measure range to a second station, the first station comprising means to receive a fine timing measurements (FTM) request from a second station, the FTM request comprises a request to suspend FTM measurements when a motion threshold has not been crossed since a last FTM measurement by the first station; and means to transmit an FTM response frame to the second station, the FTM response frame comprising a motion detection field to indicate a motion state of the first station.

Example 84 includes the subject matter of Example 83, and optionally, comprising means to suspend the FTM measurements when the motion detection field is to indicate a non-motion state of the second station since the last FTM measurement.

Example 85 includes the subject matter of Example 83 or 84, and optionally, wherein the FTM request comprises a motion threshold field, the motion threshold field comprising the motion threshold.

Example 86 includes the subject matter of any one of Examples 83-85, and optionally, wherein the motion threshold is a distance threshold.

Example 87 includes the subject matter of any one of Examples 83-86, and optionally, wherein the FTM request comprising a suspend FTM request field, the suspend FTM request field comprises an indication of the request to suspend FTM measurements.

Example 88 includes the subject matter of any one of Examples 83-87, and optionally, comprising means to determine a motion of the second station at a negotiation stage of the FTM procedure.

Example 89 includes the subject matter of any one of Examples 83-88, and optionally, comprising means to perform a measurement stage of the FTM procedure when the first station moves since the last FTM measurement.

Example 90 includes the subject matter of any one of Examples 83-89, and optionally, comprising means to operate as a responder.

Example 91 includes the subject matter of any one of Examples 83-90, and optionally, comprising means to detect motion.

Example 92 includes a system configured to measure range between stations, the system comprising a first station comprising a transmitter configured to transmit a fine timing measurements (FTM) request to a second station, the FTM request comprises a request to suspend FTM measurements when a motion threshold has not been crossed since a last FTM measurement by the second station; a receiver configured to receive an acknowledgment (ACK) from the second station in response to the FTM request, and to receive an FTM frame from the second station, the FTM frame comprising a motion detection field to indicate a motion state of the second station; and one or more dipole antennas operably coupled to the transmitter and the receiver.

Example 93 includes the subject matter of Example 92, and optionally, wherein the first station comprising a system on chip configured to suspend the FTM measurements when the motion detection field is to indicate a non-motion state of the second station since the last FTM measurement.

Example 94 includes the subject matter of Example 92 or 93, and optionally, wherein the FTM request comprises a motion threshold field, the motion threshold field comprising the motion threshold.

Example 95 includes the subject matter of any one of Examples 92-94, and optionally, wherein the motion threshold is a distance threshold.

Example 96 includes the subject matter of any one of Examples 92-95, and optionally, wherein the FTM request comprises a suspend FTM request field, the suspend FTM request field comprises an indication of the request to suspend FTM measurements.

Example 97 includes the subject matter of any one of Examples 92-96, and optionally, wherein the first station is configured to determine a motion of the second station at a negotiation stage of the FTM procedure.

Example 98 includes the subject matter of any one of Examples 92-97, and optionally, wherein the first station is configured to perform a measurement stage of the FTM procedure when the motion indication indicated that second station moved since the last FTM measurement.

Example 99 includes the subject matter of any one of Examples 92-98, and optionally, wherein the first station is configured to perform a measurement stage of the FTM procedure when the first station is stationary and the second station is moving.

Example 100 includes the subject matter of any one of Examples 92-99, and optionally, wherein the first station is configured to perform a measurement stage of the FTM procedure if both the first station and the second station are moving.

Example 101 includes the subject matter of any one of Examples 92-100, and optionally, wherein the first station is configured to operate as an initiator.

Example 102 includes a wireless system configured to measure range between two stations, the system comprising a first station comprising a receiver to receive a fine timing measurements (FTM) request from a second station, the FTM request comprises a request to suspend FTM measurements when a motion threshold has not been crossed since a last FTM measurement by the first station; and a transmitter configured to transmit an acknowledgment (ACK) to the second station in response to the FTM request, and to transmit an FTM response frame to the second station, the FTM response frame comprising a motion detection field to indicate a motion state of the first station.

Example 103 includes the subject matter of Example 102, and optionally, wherein the first station comprises a system-on-chip configured to suspend the FTM measurements when the motion detection field is to indicate a non-motion state of the second station since the last FTM measurement.

Example 104 includes the subject matter of Example 102 or 103, and optionally, wherein the FTM request comprises a motion threshold field, the motion threshold field comprising the motion threshold.

Example 105 includes the subject matter of any one of Examples 102-104, and optionally, wherein the motion threshold is a distance threshold.

Example 106 includes the subject matter of any one of Examples 102-105, and optionally, wherein the FTM request comprising a suspend FTM request field, the suspend FTM request field comprises an indication of the request to suspend FTM measurements.

Example 107 includes the subject matter of any one of Examples 102-106, and optionally, wherein the first station comprising a system on chip configured to determine a motion of the second station at a negotiation stage of the FTM procedure.

Example 108 includes the subject matter of any one of Examples 102-107, and optionally, wherein the first station is configured to perform a measurement stage of the FTM procedure when the first station moves since the last FTM measurement.

Example 109 includes the subject matter of any one of Examples 102-108, and optionally, wherein the first station is configured to operate as a responder.

Example 110 includes the subject matter of any one of Examples 102-109, and optionally, wherein the first station comprising a movement detector.

Example 111 includes the subject matter of any one of Examples 102-110, and optionally, wherein the first station comprises a system on chip (SoC) circuitry operably coupled to a radio circuitry; a motion detector operably coupled to the SoC; a memory operably coupled to the SoC; an antenna port operably coupled to the radio circuitry; and at least one antenna operably coupled to the antenna port.

In the foregoing description, numerous specific details are provided, such as examples of layouts, distances, network examples, etc., to provide a thorough understanding of some demonstrative embodiments. One skilled in the relevant art will recognize, however, that some embodiments can be practiced without one or more of the specific details, or with other methods, components, layouts, etc. In other instances, well-known structures, materials, or operations are not shown or described in detail to avoid obscuring aspects of the disclosure.

While the forgoing examples are illustrative of the principles of some embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

What is claimed is:

1. An apparatus comprising,
a memory; and
a processor configured to cause a first station to:
transmit a fine timing measurements (FTM) request to a second station, the FTM request comprising a request to suspend FTM measurements when a motion threshold has not been crossed since a last FTM measurement by the second station;
process a received acknowledgment (ACK) from the second station in response to the FTM request; and
process a received FTM frame from the second station, the FTM frame comprising a motion detection field to indicate a motion state of the second station.

2. The apparatus of claim 1 configured to cause the first station to:
suspend the FTM measurements when the motion detection field is to indicate a non-motion state of the second station since the last FTM measurement.

3. The apparatus of claim 1, wherein the FTM request comprises a motion threshold field, the motion threshold field comprising the motion threshold.

4. The apparatus of claim 1, wherein the motion threshold is a distance threshold.

5. The apparatus of claim 1, wherein the FTM request comprises a suspend FTM request field, the suspend FTM request field comprises an indication of the request to suspend FTM measurements.

6. The apparatus of claim 1 configured to cause the first station to:
determine a motion of the second station at a negotiation stage of an FTM procedure.

7. The apparatus of claim 1 configured to cause the first station to:
perform a measurement stage of an FTM procedure when the motion detection field indicates that the second station moved since the last FTM measurement.

8. The apparatus of claim 1 configured to cause the first station to:
perform a measurement stage of an FTM procedure when the first station is stationary and the second station is moving.

9. The apparatus of claim 1 configured to cause the first station to:
perform a measurement stage of an FTM procedure if both the first station and the second station are moving.

10. The apparatus of claim 1 configured to cause the first station to operate as an initiator.

11. The apparatus of claim 1 comprising:
a system on chip (SoC) circuitry operably coupled to a radio circuitry;
a motion detector operably coupled to the SoC;
an antenna port operably coupled to the radio circuitry; and
at least one antenna operably coupled to the antenna port.

12. An apparatus comprising:
a memory; and
a processor configured to cause a first station to:
process a received fine timing measurements (FTM) request from a second station, the FTM request comprising a request to suspend FTM measurements when a motion threshold has not been crossed since a last FTM measurement by the first station;
send an acknowledgment (ACK) to the second station in response to the FTM request; and
send an FTM response frame to the second station, the FTM response frame comprising a motion detection field to indicate a motion state of the first station.

13. The apparatus of claim 12 configured to cause the first station to:
suspend the FTM measurements when the motion detection field is to indicate a non-motion state of the first station since the last FTM measurement.

14. The apparatus of claim 12, wherein the FTM request comprises a motion threshold field, the motion threshold field comprising the motion threshold.

15. The apparatus of claim 12, wherein the motion threshold is a distance threshold.

16. The apparatus of claim 12, wherein the FTM request comprises a suspend FTM request field, the suspend FTM request field comprises an indication of the request to suspend FTM measurements.

17. The apparatus of claim 12 configured to cause the first station to:
determine a motion of the second station at a negotiation stage of an FTM procedure.

18. The apparatus of claim 12 configured to cause the first station to:
perform a measurement stage of an FTM procedure when the first station moves since the last FTM measurement.

19. The apparatus of claim 12 configured to cause the first station to operate as a responder.

20. The apparatus of claim 12, comprising a movement detector.

21. A computer program product comprising one or more tangible computer readable non-transitory storage media comprising computer-executable instructions operable to, when executed by at least one computer processor of a first station, result in:
processing a fine timing measurements (FTM) request to be transmitted to a second station, the FTM request comprises a suspend FTM request field and a motion threshold field;
processing an acknowledgment (ACK) received from the second station in response to the FTM request;
processing a received FTM frame from the second station, the FTM frame comprising a motion detection field to indicate a motion of the second station; and
suspending FTM measurements when the motion detection field is to indicate a non-motion state of the second station since the last FTM measurement.

22. The computer program product of claim 21, wherein the motion threshold is a distance threshold.

23. The computer program product of claim 21, wherein the suspend FTM request field comprises an indication of a request to suspend FTM measurements.

24. The computer program product of claim 21, wherein the instructions, when executed, result in:
determining a motion of the second station at a negation stage of an FTM procedure.

25. The computer program product of claim 21, wherein the instructions, when executed, result in:
performing a measurement stage of an FTM procedure if the second station moved since the last FTM measurement.

* * * * *